July 10, 1951   R. M. HILL   2,559,621
METHOD OF FORMING TUBULAR BODIES WITH
PERIPHERAL PROJECTIONS
Filed Dec. 21, 1949

Inventor
RALPH M. HILL
by
Walter F. Kaufman
Attorney

Patented July 10, 1951

2,559,621

UNITED STATES PATENT OFFICE 2,559,621

METHOD OF FORMING TUBULAR BODIES WITH PERIPHERAL PROJECTIONS

Ralph M. Hill, Lancaster Township, Lancaster County, Pa., assignor to Armstrong Cork Company, Lancaster, Pa., a corporation of Pennsylvania Application December 21, 1949, Serial No. 134,276

7 Claims. (Cl. 51—281)

This invention relates to a method of forming by a simple grinding operation a generally cylindrical tubular body of yieldable material having a generally circular outer periphery with one or more curved projections extending from the periphery. More particularly, the invention relates to a method of so forming tubular bodies and severing them into ring-type gaskets.

In the assembly of gaskets in cover plates, for example, such as are used on oil filters and other automotive parts, the gasket is inserted into the stamped metal cover and, in assembly, the cover with the inserted gasket is turned over and placed in position on top of the oil filter housing. Where assembly line procedures are used, it is necessary to hold the gasket dimensions within fairly close tolerances to permit rapid assembly of the gasket within the stamped metal cover, where it must fit tightly enough so as not to fall out when the cover is inverted in assembly with the housing. It has been discovered that rapid assembly may be effected and adequate frictional engagement insured if the gasket has one or more projections extending from the outer periphery and adapted to engage the metal cover with which the gasket is to be assembled. The projection frequently needs to extend a few thousandths of an inch beyond the periphery of the gasket to secure the necessary frictional engagement with the metal cover. The gaskets are generally severed from tubular stock; and in order to provide one or more projections on the outer periphery, expensive milling or forming operations have been found necessary.

It is an object of the present invention to provide a method of forming by a simple grinding operation tubular gasket stock with a generally circular outer periphery and having one or more projections extending from the periphery.

A further object of the invention is to provide a method of forming a gasket or the like by first forming by a simple grinding operation a tubular body with one or more projections on the outer peripheral surface and subsequently severing the tubular stock into gaskets.

Other objects of the invention will become obvious from a consideration of a detailed description of certain embodiments of the invention which follows. In the accompanying drawing which illustrates these embodiments:

According to the invention, a generally cylindrical tubular body of yieldable material is disposed upon a generally cylindrical mandrel having one or more inwardly directed recesses formed in the periphery thereof and into which the tubular body of yieldable material may be distorted. A rotating grinding wheel is brought into engagement with the body while the body is supported on the mandrel and is rotating with the mandrel. The mandrel is preferably driven to rotate the body to be ground while the grinding wheel severs material from the periphery of the body. As the grinding operation proceeds, material is removed from the surface of the yieldable body, less material is removed in the area of the body which is under elastic deformation by being distorted into a recess in the mandrel than the remainder of the body, and thus there is formed a generally cylindrical tubular article having one or more curved projections extending from the periphery thereof. The number of projections on the surface will depend upon the number of recesses in the mandrel.

Figure 1:
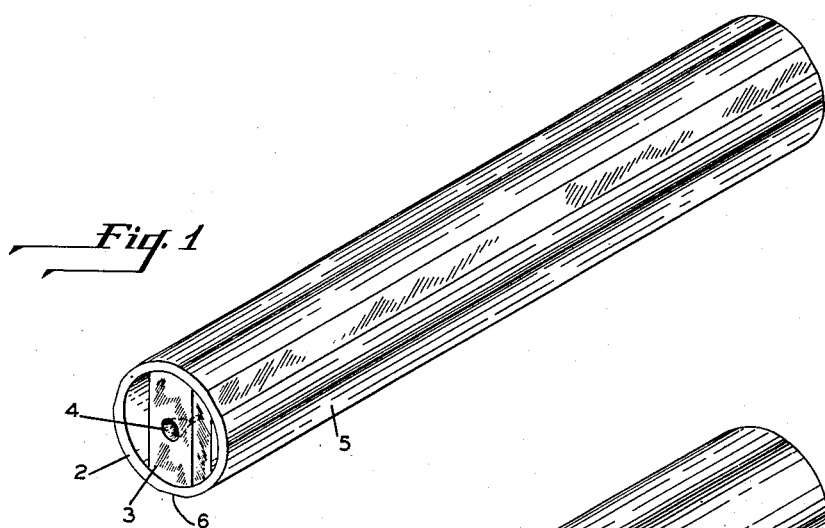
Figure 1 is a perspective view of a hollow supporting mandrel for use in the practice of the invention.

Referring now to the drawing, a mandrel 2 is shown in Figure 1 which is provided at each of its ends with a centering support 3 having a lathe center opening 4 therein. The outer periphery 5 of the mandrel is generally circular but is provided with one or more recesses or depressions 6 formed in the outer surface. In the embodiment illustrated, three such recesses 6 have been provided. The mandrel may be formed as a tube section, as shown in Figure 1, or may be solid. Generally, where the diameter of the surface 5 is one inch or less, a solid mandrel will be preferred; and where the diameter is over one inch, a hollow mandrel structure will be preferred. The lathe centers are provided so that the mandrel may be rotated about its axis when mounted in a lathe or similar supporting structure with a driving lathe dog. The recesses 6 are preferably formed by grinding or milling flats into the periphery 5 of the mandrel 2. They may be otherwise shaped, however. With a mandrel for the manufacture of gaskets having an inside diameter of about 4¼ inches, the flats may be formed by grinding to a depth of about ⅛ inch from the outer periphery of the mandrel, measured as a distance perpendicular to the flat surface at the center thereof. The width and depth of the recess will be determined by the size and contour of the projection to be formed and will also depend to some extent upon the hardness and yieldability of the body material. The term "recess" is used in its broadest sense to include all sizes and kinds of depressions in the generally circular periphery of the mandrel into which the tubular body material may be deformed.

Figure 2:
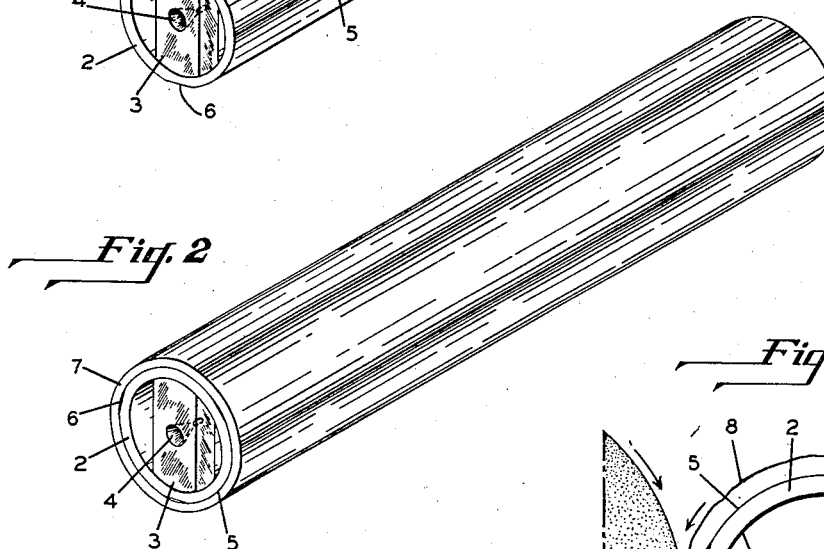
Figure 2 is a perspective view showing the supporting mandrel of Figure 1 with a section of tubular gasket stock disposed thereover.
Figure 4:
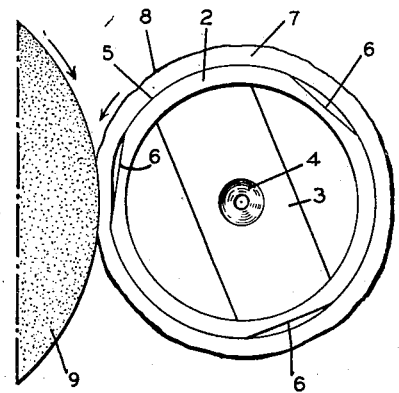
Figure 4 is a diagrammatic end view of a mandrel with a section of a tubular stock disposed thereover and a grinding wheel in engagement therewith.

Referring now to Figures 2 and 4, there is shown a body of yieldable material 7 disposed over the mandrel 2. This body 7 may be formed, for instance, of a rubber stock having a Shore Durometer hardness of about 85. The tubular stock is generally formed by disposing a body of rubber composition upon a cylindrical forming mandrel, wrapping the body with wet fabric tape and vulcanizing in a steam autoclave vulcanizer. After vulcanization the fabric tape is removed, and the tube slipped from the forming mandrel. This results in a rough, irregular outer surface 8 on the body 7, which has been indicated diagrammatically in Figure 4. The inner surface is mandrel-formed and generally smooth and regular. The inner diameter of the body 7 will be about 4¼ inches in the embodiment chosen for illustration, and the outer diameter of the supporting mandrel 2 will be approximately the same, although the mandrel may be slightly greater in order to secure good frictional engagement between the supporting mandrel and the tubular body in order to prevent relative motion therebetween during the grinding operation.

Figure 3:
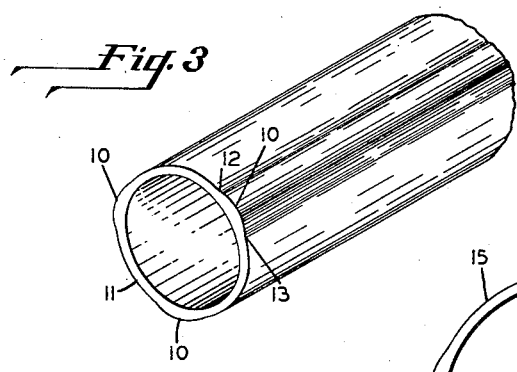
Figure 3 is a perspective view showing a portion of the finished tubular stock.

The mandrel with its applied tubular body is disposed in a lathe or other support and is rotated about the centers 4, preferably in the direction of the arrow shown in Figure 4, and a grinding wheel 9, which is preferably rotated in the same direction, is brought into engagement with the outer surface 8 of the body 7 on the mandrel 2. This grinding operation causes the yieldable body to be elastically deformed in the areas which overlie the recesses 6 in the supporting mandrel, as indicated diagrammatically in the portion shown in Figure 4 where the grinding wheel is in contact with the surface 8 at a point disposed outwardly of one of the recesses 6. This view has been exaggerated to illustrate the deformation of the body. As the grinding wheel 9 rotates in engagement with the surface 8, and the body 7 and the supporting mandrel 2 are rotated about the centers 4, which are coincident with the axis of the tubular body 7, material is ground from the surface 8, but where the body is deformed into the recesses 6, less material is removed than from other portions of the body where the body is supported against deformation by the circular peripheral portions 5 of the mandrel 2. As a result of this uneven removal of material, there is formed a tubular body having rounded projections 10 extending outwardly from the generally circular periphery 11 of the body, as shown in Figure 3. It will be noted by reference to Figure 3 that the projections 10 extend throughout the length of the body and are disposed in positions corresponding to the positions of the recesses 6 in the supporting mandrel 2, three being provided, spaced on 120° centers, in Figure 3. In the embodiment chosen for illustration wherein the gasket has an inner diameter of about 4¼ inches and an outer diameter of about 4¾ inches, the projections may extend about 15 to 25 thousandths of an inch beyond the generally circular outer periphery of the body and may be of a width from line 12 to line 13 of about 1 to 1½ inches. It will be observed that the outer surface of the finished article is smooth, well-rounded, and free of sharp projections which might be objectionable in assembly line operations.

Figure 5:
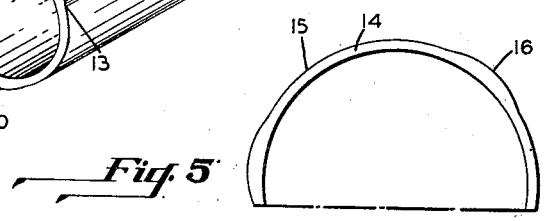
Figure 5 is a partial plan view of a completed gasket.

In the fabrication of gaskets from the tubular stock, the finished body shown in Figure 3 may be positioned upon a cylindrical supporting mandrel, and gaskets of the desired thickness or width (measured along the axis of the tubular body) may be severed therefrom. Such a gasket is shown in Figure 5. It includes a body portion 14 having a generally circular outer periphery 15 with rounded projections 16 extending outwardly from the generally circular periphery.

Where the tubular body stock is softer than in the example given above and more readily deformable, it may be disposed over a mandrel having an outer diameter somewhat greater than the internal diameter of the tubular stock to thereby deform the stock into the recess or recesses provided in the mandrel. The body may then be ground, and results comparable in all respects to those described above will be obtained. In this method the deformation or distortion of the body is effected prior to grinding, rather than during the grinding operation. Upon removal of the tubular body from the mandrel, the body will re-expand, and it will be found that projections will exist on the outer periphery, corresponding to the areas of the tubular body deformed into the recess or recesses of the supporting mandrel during the grinding operation.

I claim:

1. In a method of forming by a simple grinding operation a generally cylindrical tubular body of yieldable material such as rubber stock for severance into ring gaskets and the like having a generally circular outer periphery with one or more curved projections extending from the periphery, the steps comprising disposing a generally cylindrical tubular body of said yieldable material having a generally circular inner periphery over a generally cylindrical mandrel having a generally circular outer periphery and having at least one inwardly directed recess in the outer periphery thereof extending generally longitudinally of the mandrel and into which said yieldable material is distortable, distortion of said body of yieldable material into said recess in said mandrel changing the shape of both the outer and inner surfaces of said body, pressing said body between a rotating grinding wheel and said recessed mandrel and while said body is under elastic deformation in said recessed area of said mandrel abrading less material from the body in the distorted area of the outer periphery thereof than the remainder of the body to form a generally cylindrical article having a generally circular inner periphery and having one or more curved projections extending from the generally circular outer periphery thereof.

2. In a method of forming by a simple grinding operation a generally cylindrical tubular body of yieldable material such as rubber stock for severance into ring gaskets and the like having a generally circular outer periphery with one or more curved projections extending from the periphery, the steps comprising disposing a generally cylindrical tubular body of said yieldable material having a generally circular inner periphery over a generally cylindrical mandrel having a generally circular outer periphery and having at least one inwardly directed recess in the outer periphery thereof into which said yieldable material is distortable, distortion of said body of yieldable material into said recess in said mandrel changing the shape of both the outer and inner surfaces of said body, pressing said body between a rotating grinding wheel and said recessed mandrel while the body and mandrel are in rotation about the axis of the body, and while said body is under elastic deformation in said recessed area of said mandrel abrading less material from the body in the distorted area of the outer periphery thereof than the remainder of the body to form a generally cylindrical article having a generally circular inner periphery and having one or more curved projections extending from the generally circular outer periphery thereof.

3. In a method of forming by a simple grinding operation a generally cylindrical tubular body of yieldable material such as rubber stock having a generally circular outer periphery with a plurality of curved projections extending from the periphery, the steps comprising disposing a generally cylindrical tubular body of said yieldable material having a generally circular inner periphery over a generally cylindrical mandrel having a generally circular outer periphery and having a plurality of circumferentially spaced inwardly directed recesses in the outer periphery thereof into which said yieldable material is distortable, distortion of said body of yieldable material into said recesses in said mandrel changing the shape of both the outer and inner surfaces of said body, pressing said body between a rotating grinding wheel and said recessed mandrel, and simultaneously elastically deforming the body into said recesses and abrading less material from the body in the distorted areas of the outer periphery thereof than the remainder of the body to form a generally cylindrical article having a generally circular outer periphery and having a plurality of curved projections extending from the generally circular outer periphery thereof.

4. In a method of forming from a tubular body of yieldable material such as rubber stock gaskets and the like having a generally circular outer periphery with one or more curved projections extending from the periphery, the steps comprising disposing a generally cylindrical tubular body of said yieldable material having a generally circular inner periphery over a generally cylindrical mandrel having a generally circular outer periphery and having at least one inwardly directed recess in the outer periphery thereof extending generally longitudinally of the mandrel and into which said yieldable material is distortable, distortion of said body of yieldable material into said recess in said mandrel changing the shape of both the outer and inner surfaces of said body, pressing said body between a rotating grinding wheel and said recessed mandrel, while said body is under elastic deformation in said recessed area of said mandrel and said body is in rotation about its axis, abrading less material from the body in the distorted area of the outer periphery thereof than the remainder of the body to form a generally cylindrical article having a generally circular inner periphery and having one or more curved projections extending from the generally circular outer periphery thereof, and severing said body into gaskets by cutting the body into pieces along lines which extend generally normal to the axis of the body.

5. In a method of forming by a simple grinding operation from a rough blank a generally cylindrical tubular body of yieldable material such as rubber stock having a finished, smooth, and generally circular outer periphery with one or more curved projections extending from the periphery, the steps comprising disposing a blank of said yieldable material having a generally circular inner periphery and a rough outer surface over a generally cylindrical mandrel having a generally circular outer periphery and having at least one inwardly directed recess in the outer periphery thereof extending generally longitudinally of the mandrel and into which said yieldable material is distortable during grinding, distortion of said body of yieldable material into said recess in said mandrel changing the shape of both the outer and inner surfaces of said body, pressing said body between a rotating grinding wheel and said recessed mandrel, and abrading the rough outer surface of said blank while progressively elastically deforming the portion of the body disposed over the recess into the recess as the blank rotates in contact with the rotating grinding wheel, removing less material from the body in such distorted area of the outer periphery of the blank than the remainder of the body to form a generally cylindrical article having a generally circular inner periphery and having one or more generally rounded projections on the generally circular outer periphery thereof.

6. In a method of forming by a simple grinding operation a generally cylindrical tubular body of yieldable material such as rubber stock having a generally circular outer periphery with one or more curved projections extending from the periphery, the steps comprising disposing a generally cylindrical tubular body of said yieldable material having a generally circular inner periphery over a generally cylindrical mandrel having a generally circular outer periphery and having at least one inwardly directed recess in the outer periphery thereof into which said yieldable material is distortable, distortion of said body of yieldable material into said recess in said mandrel changing the shape of both the outer and inner surfaces of said body, the body lying over said recess but not deformed thereinto, pressing said body between a rotating grinding wheel and said recessed mandrel, and while elastically deforming said body into said recessed area of said mandrel abrading less material from the body in the distorted area in the outer periphery thereof than the remainder of the body to form a generally cylindrical article having a generally circular inner periphery and having one or more curved projections extending from the generally circular outer periphery thereof.

7. In a method of forming by a simple grinding operation a generally cylindrical tubular body of yieldable material such as rubber stock having a generally circular outer periphery with one or more curved projections extending from the periphery, the steps comprising stretching a generally cylindrical tubular body of said yieldable material having a generally circular inner periphery over a generally cylindrical mandrel having a generally circular outer periphery and having at least one inwardly directed recess in the outer periphery thereof into which said yieldable material is distorted by elastic deformation thereof, grinding a substantially cylindrical surface on said body while so elastically deformed, and removing the body from the mandrel, whereupon the body re-expands in the elastically deformed area and provides a generally circular outer periphery having one or more curved projections extending outwardly therefrom.

RALPH M. HILL.

REFERENCES CITED

The following references are of record in the file of this patent:

UNITED STATES PATENTS

| Number | Name | Date |
| --- | --- | --- |
| 1,118,784 | Lanchester | Nov. 24, 1914 |
| 1,660,506 | Hamilton | Feb. 28, 1928 |
| 1,818,085 | Nelson | Aug. 11, 1931 |
| 2,016,590 | Bussing | Oct. 8, 1935 |
| 2,269,556 | Clair | Jan. 13, 1942 |